United States Patent
Yu et al.

(10) Patent No.: US 8,624,573 B2
(45) Date of Patent: Jan. 7, 2014

(54) POWER CONVERTERS INCLUDING ZERO-CURRENT DETECTORS AND METHODS OF POWER CONVERSION

(75) Inventors: Jin-Hyuck Yu, Hwaseong-si (KR); Dong-Jin Keum, Suwon-si (KR); Hyoung-Seok Oh, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 283 days.

(21) Appl. No.: 13/116,296

(22) Filed: May 26, 2011

(65) Prior Publication Data
US 2011/0291632 A1 Dec. 1, 2011

(30) Foreign Application Priority Data
May 26, 2010 (KR) .......................... 10-2010-0049148

(51) Int. Cl.
*G05F 1/00* (2006.01)
(52) U.S. Cl.
USPC .......................................................... 323/285
(58) Field of Classification Search
USPC .......................................... 323/282, 284, 285
See application file for complete search history.

(56) References Cited

U.S. PATENT DOCUMENTS

| 6,310,469 B1 | 10/2001 | Bentolila et al. | |
| 2005/0258814 A1* | 11/2005 | Chen et al. | 323/285 |
| 2007/0247130 A1* | 10/2007 | Tseng | 323/284 |

FOREIGN PATENT DOCUMENTS

| JP | 2002044939 A | 2/2002 |
| JP | 2002281744 A | 9/2002 |
| JP | 2009278713 A | 11/2009 |

\* cited by examiner

*Primary Examiner* — Harry Behm
*Assistant Examiner* — Matthew Grubb
(74) *Attorney, Agent, or Firm* — Harness, Dickey & Pierce, P.L.C.

(57) ABSTRACT

A power converter includes a zero-current detector having an adjustable offset voltage. The power converter includes a power converting unit and a switch driving circuit. The power converting unit generates a DC output voltage based on a pull-up driving signal, a pull-down driving signal and a DC input voltage. The switch driving circuit generates a first detection voltage signal based on the DC output voltage. The switch driving circuit includes a zero-current detector configured to adjust an offset voltage based on the first detection voltage signal and generate a zero-current detecting signal based on the offset voltage. The offset voltage and the zero-current detecting signal are associated with a current in the power converting unit. The switch driving circuit also includes a pulse-frequency modulating circuit configured to perform a pulse-frequency modulation (PFM) to generate the pull-up driving signal and the pull-down driving signal based on the zero-current detecting signal.

3 Claims, 8 Drawing Sheets

POWER CONVERTERS INCLUDING ZERO-CURRENT DETECTORS AND METHODS OF POWER CONVERSION

CROSS-REFERENCE TO RELATED APPLICATION

This application claims priority under 35 U.S.C. §119 to Korean Patent Application No. 10-2010-0049148 filed on May 26, 2010, the entire contents of which are hereby incorporated by reference.

BACKGROUND

1. Field

Example embodiments of inventive concepts relate to power converters, and more particularly, to power converters including zero-current detectors and methods of power conversion.

2. Description of Related Art

Due to environmental reasons, energy saving is particularly desirable. In mobile information processing devices such as a cellular phone and a personal digital assistant which use batteries, power saving is also desirable. Switch-mode power supplies such as step-down converters, boost converters, and buck-boost converters have been used in various electronic devices.

SUMMARY

Example embodiments of inventive concepts provide a power converter having high conversion efficiency by performing a pulse-frequency-modulation (PFM) in response to an output signal of a zero-current detector that has an adjustable offset voltage.

Example embodiments of inventive concepts also provide a switch driving circuit of a power converter performing a PFM in response to an output signal of a zero-current detector that has an adjustable offset voltage.

Example embodiments of inventive concepts also provide a method of power conversion having high conversion efficiency by performing a PFM in response to an output signal of a zero-current detector that has an adjustable offset voltage.

Inventive concepts are not limited to the above disclosure; other objectives may become apparent to those of ordinary skill in the art based on the following descriptions.

In accordance with an aspect of inventive concepts, a power converter includes a power converting unit and a switch driving circuit.

The power converting unit generates a direct current (DC) output voltage based on a pull-up driving signal, a pull-down driving signal and a DC input voltage. The switch driving circuit generates a first detection voltage signal based on the DC output voltage. The switch driving circuit includes a zero-current detector configured to adjust an offset voltage based on the first detection voltage signal and generate a zero-current detecting signal based on the offset voltage. The offset voltage and the zero-current detecting signal are associated with a current in the power converting unit. The switch driving circuit also includes a pulse-frequency modulating circuit configured to perform a pulse-frequency modulation (PFM) to generate the pull-up driving signal and the pull-down driving signal based on the zero-current detecting signal.

In some example embodiments, the power converting unit includes a pull-up transistor, a pull-down transistor, an inductor and a capacitor.

The pull-up transistor has an input terminal configured to receive the DC input voltage and an output terminal connected to a first node of the power converting unit, the pull-up transistor operates in response to the pull-up driving signal. The pull-down transistor is coupled between the first node and a ground voltage source, the pull-down transistor operates in response to the pull-down driving signal. The inductor is coupled between the first node and an output node of the power converting unit, and the capacitor is coupled between the output node and the ground voltage source.

In some example embodiments, the switch driving circuit includes the zero-current detector configured to adjust the offset voltage and the zero-current detecting signal.

In some example embodiments, the zero-current detector is configured to determine when to activate the pull-up transistor.

In some example embodiments, the zero-current detector is configured to determine when to deactivate the pull-down transistor.

In some example embodiments, the switch driving circuit includes the zero-current detector having the offset voltage. The zero-current detector is configured to detect if a magnitude of a current flowing through the inductor is zero.

In some example embodiments, the power converting unit includes the zero-current detector configured to determine the zero-current detecting signal based on the voltage signal of the first node and the ground voltage.

In some example embodiments, the zero-current detector may include an offset generator and an amplifier.

The offset generator generates an additional driving current in response to the first detection voltage signal. The amplifier amplifies a difference between the voltage signal of the first node and the ground voltage. The zero-current detecting signal is based on the additional driving current and the amplified difference.

In some example embodiments, the zero-current detecting signal is based on the additional driving current.

In some example embodiments, the amplifier may include a differential input stage and an output stage.

The differential input stage amplifies the difference between the voltage signal of the first node and the ground voltage, and the output stage amplifies an output signal of the differential input stage to generate the zero-current detecting signal.

In some example embodiments, the offset generator may include a first transistor and a second transistor.

The first transistor is connected to a transistor of the output stage. The second transistor is coupled between the first transistor and an output terminal of the zero-current detector, the second transistor operates in response to the first detection voltage signal.

In some example embodiments, the switch driving circuit may include a comparator and a current sensor.

The comparator compares the DC output voltage with a reference voltage to generate the first detection voltage signal. The current sensor detects a current of the inductor to generate a current-sensing output signal. The pulse-frequency modulating circuit performs the PFM based on the first detection voltage signal, the zero-current detecting signal and the current-sensing output signal to generate the pull-up driving signal and the pull-down driving signal.

In accordance with another aspect of inventive concepts, a switch driving circuit of a power converter includes a comparator, a zero-current detector, a current sensor and a pulse-frequency modulating circuit.

The comparator compares a DC output voltage with a reference voltage to generate a first detection voltage signal.

The zero-current detector amplifies a drain-source voltage of a pull-down transistor of a power converting unit, generates an output offset current in response to the first detection voltage signal, and generates a zero-current detecting signal that incorporates the output offset current. The current sensor detects a current of the power converting unit to generate a current-sensing output signal. The pulse-frequency modulating circuit performs a PFM based on the first detection voltage signal, the zero-current detecting signal and the current-sensing output signal to generate a pull-up driving signal and a pull-down driving signal.

In accordance with still another aspect of inventive concepts, a method of power conversion includes generating a DC output voltage based on a pull-up driving signal, a pull-down driving signal and a DC input voltage, generating a first detection voltage signal based on the DC output voltage, adjusting an offset voltage of a zero-current detector in response to the first detection voltage signal, generating a zero-current detecting signal based on the adjusting, and performing a PFM to generate the pull-up driving signal and the pull-down driving signal based on the first detection voltage signal and the zero-current detecting signal.

In some example embodiments, generating the first detection voltage signal may include comparing the DC output voltage with a reference voltage and the first detection voltage signal is based on the comparing.

In some example embodiments, adjusting the offset voltage of the zero-current detector may include amplifying a drain-source voltage of a pull-down transistor of a power converting unit and generating an additional driving current in response to the first detection voltage signal. The generating the zero-current detecting signal may generate the zero-current detecting signal based on the additional driving current.

In some example embodiments, the generating the zero-current detecting signal may include adding a voltage corresponding to the additional driving current to the zero-current detecting signal.

In some example embodiments, the method may include determining an activation time of a pull-up transistor of a power converting unit based on the added voltage.

At least another aspect of inventive concepts discloses a power converter including a converting unit configured to output an output voltage based on a pull-up driving signal and a pull-down driving signal, and a switch driving circuit configured to generate the pull-up driving signal and the pull-down driving signal, the switching driving circuit including, a zero-current detector configured to generate an adjustable offset voltage, the pull-up driving signal and the pull-down driving signal being based on the adjustable offset voltage.

A switch driving circuit having an adjustable offset voltage and a power converter including the switch driving circuit in accordance with example embodiments of inventive concepts have high conversion efficiency by performing PFM in response to an output signal of a zero-current detector. The power converter in accordance with example embodiments of inventive concepts turns on a PMOS transistor of a power converting unit to increase the conversion efficiency before inductor current flows in the reverse direction. Therefore, the power converter in accordance with example embodiments of inventive concepts may be little influenced by a distribution of an offset voltage of the zero-current detector, and may have little power consumption.

BRIEF DESCRIPTION OF THE DRAWINGS

The above and other objects, features and advantages of inventive concepts will become more apparent by describing in detail example embodiments thereof with reference to the attached drawings in which like numbers refer to like elements throughout the description of the figures. The drawings are not necessarily to scale, emphasis instead being placed upon illustrating the principles of inventive concepts. In the drawings.

DETAILED DESCRIPTION OF EXAMPLE EMBODIMENTS

Figure 1:
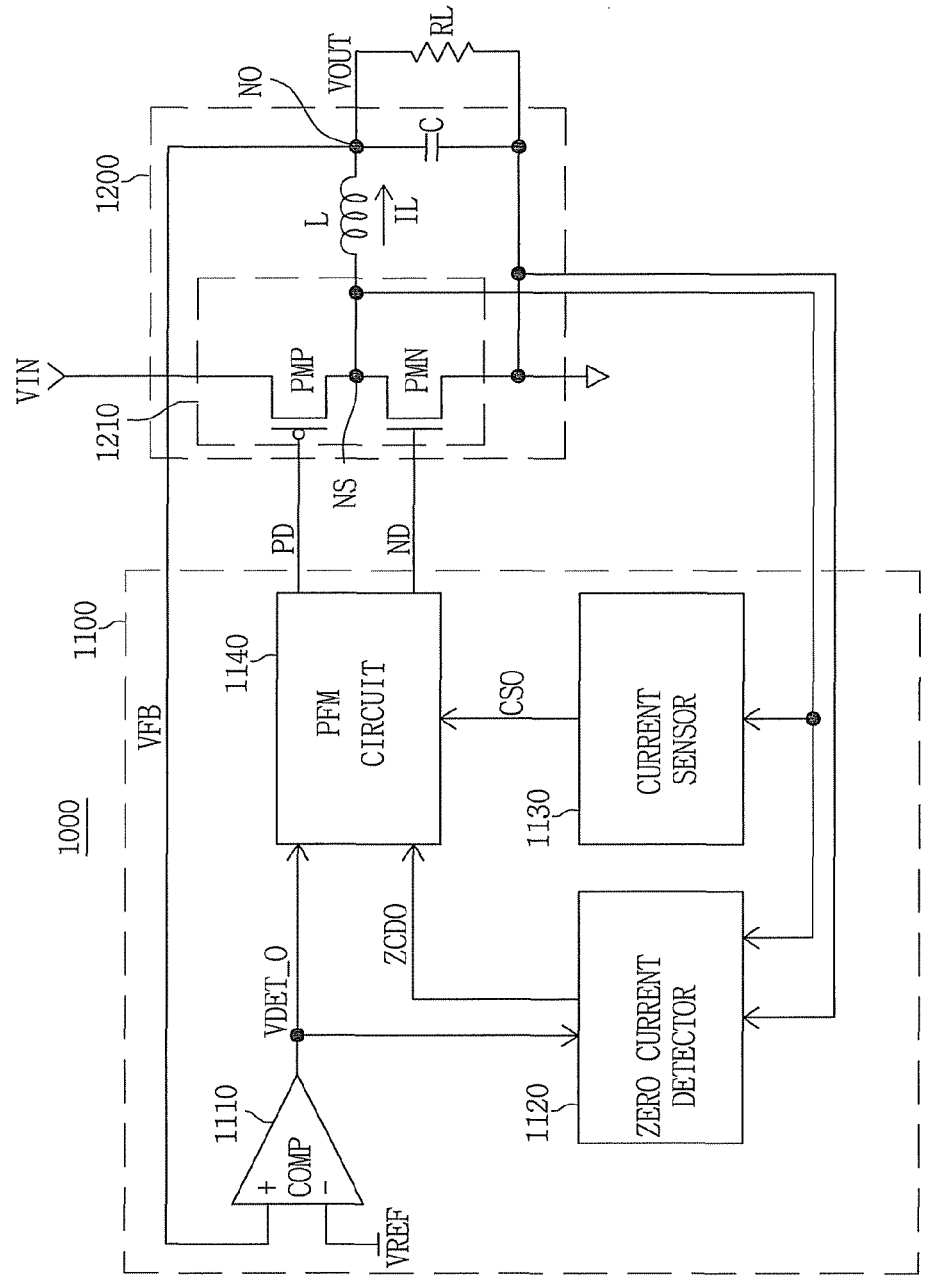
FIG. 1 is a circuit diagram illustrating a step-down converter in accordance with example embodiments of inventive concepts.

Various example embodiments will now be described more fully with reference to the accompanying drawings in which some embodiments are shown. These inventive concepts may, however, be embodied in different forms and should not be construed as limited to the embodiments set forth herein. Rather, example embodiments are provided so that this disclosure is thorough and complete and fully conveys inventive concepts to those skilled in the art. In the drawings, the sizes and relative sizes of layers and regions may be exaggerated for clarity.

It will be understood that when an element or layer is referred to as being "on," "connected to" or "coupled with" another element or layer, it can be directly on, connected or coupled with the other element or layer or intervening elements or layers may be present. In contrast, when an element is referred to as being "directly on," "directly connected to" or "directly coupled with" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of inventive concepts. As used herein, the singular forms "a," "an" and "the" are intended to include the plural aims as well, unless the context clearly indicates otherwise. It will be further understood that the terms "comprises," "comprising," "includes" and "including," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of inventive concepts.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a circuit diagram illustrating a step-down converter 1000 in accordance with example embodiments of inventive concepts.

Referring to FIG. 1, the step-down converter 1000 includes a switch driving circuit 1100 and a power converting unit 1200.

The power converting unit 1200 generates a DC output voltage VOUT based on a pull-up driving signal PD, a pull-down driving signal ND and a DC input voltage VIN. The switch driving circuit 1100 may include a comparator 1110, a zero-current detector 1120, a current sensor 1130 and a pulse-frequency modulating circuit 1140. The switch driving circuit 1100 generates a first detection voltage signal VDET_O based on a feedback voltage VFB corresponding to the DC output voltage VOUT, and adjusts an offset voltage of the zero-current detector 1120 to generate a zero-current detecting signal ZCDO. Further, the switch driving circuit 1100 performs a pulse-frequency-modulation (PFM) to generate the pull-up driving signal PD and the pull-down driving signal ND based on the first detection voltage signal VDET_O and the zero-current detecting signal ZCDO.

The power converting unit 1200 may include a switching unit 1210 comprised of a pull-up transistor PMP and a pull-down transistor PMN, an inductor L and a capacitor C.

The pull-up transistor PMP has an input terminal to which the DC input voltage VIN is applied and an output terminal connected to a sensing node NS, and operates in response to the pull-up driving signal PD. The pull-down transistor PMN is coupled between the sensing node NS and a ground, and operates in response to the pull-down driving signal ND. The inductor L is coupled between the sensing node NS and an output node NO, and the capacitor C is coupled between the output node NO and the ground.

The zero-current detector 1120 compares a voltage signal of the sensing node NS and the ground voltage to generate the zero-current detecting signal ZCDO in response to the first detection voltage signal VDET_O. The comparator 1110 compares the feedback voltage VFB corresponding to the DC output voltage VOUT with a reference voltage VREF to generate the first detection voltage signal VDET_O. The current sensor 1130 detects a peak current of the inductor L to generate a current-sensing output signal CSO. The pulse-frequency modulating circuit 1140 performs the PFM based on the first detection voltage signal VDET_O, the zero-current detecting signal ZCDO and the current-sensing output signal CSO to generate the pull-up driving signal PD and the pull-down driving signal ND.

Figure 2:
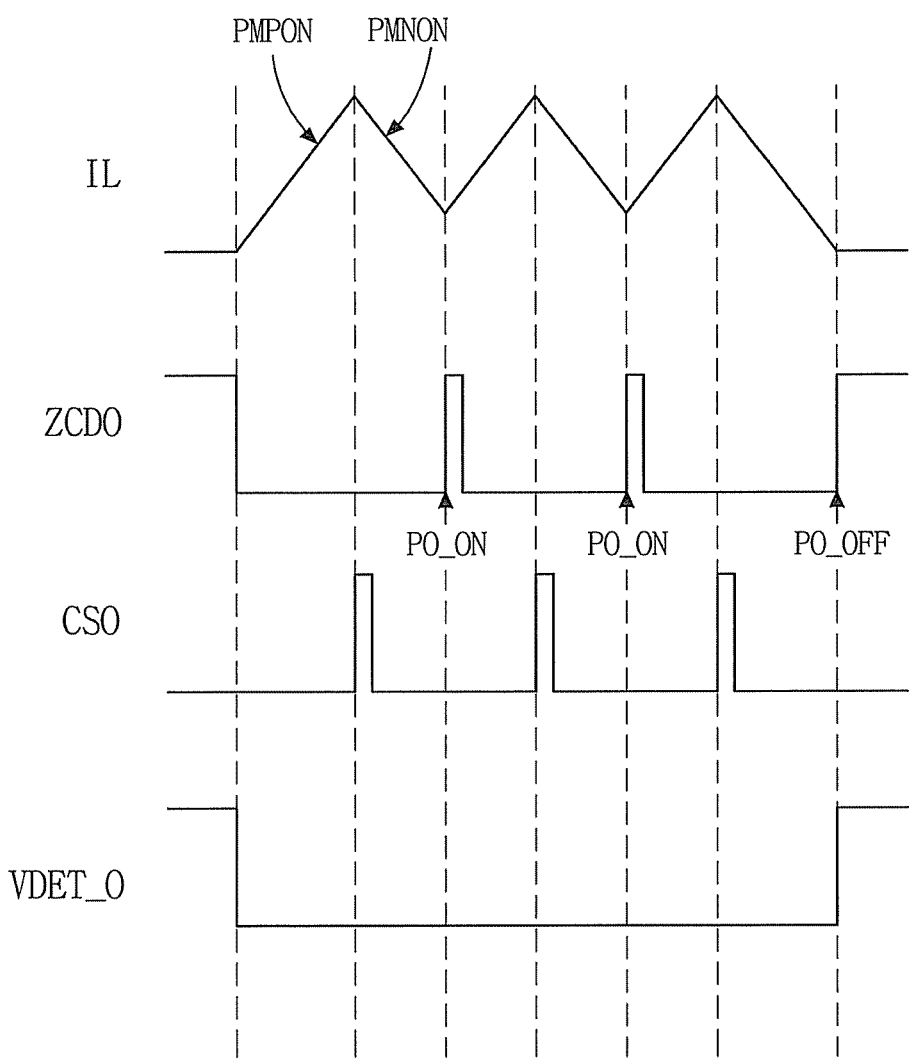
FIG. 2 is a timing diagram illustrating operation of the step-down converter shown in FIG. 1.

FIG. 2 is a timing diagram illustrating operation of the step-down converter 1000 shown in FIG. 1. In FIG. 2, IL denotes a current flowing through the inductor L, ZCDO denotes the zero-current detecting signal which is an output signal of the zero-current detector 1120, CSO denotes the current-sensing output signal which is an output signal of the current sensor 1130, and VDET_O denotes the first detection voltage signal which is an output signal of the comparator 1110.

Referring to FIG. 2, the inductor current IL increases and decreases repeatedly according to a switching operation of the pull-up transistor PMP and the pull-down transistor PMN. The inductor current IL may have a positive slope when the pull-up transistor PMP is in the on state and the pull-down transistor PMN is in the off state (PMPON), and may have a negative slope when the pull-up transistor PMP is in the off state and the pull-down transistor PMN is in the on state (PMNON). The positive slope is proportional to a difference between the DC input voltage VIN and the DC output voltage VOUT, and the negative slope is proportional to a magnitude of the DC output voltage VOUT.

The inductor current IL changes from the positive slope to the negative slope in response to a pulse of the current-sensing output signal CSO corresponding to the peak current of the inductor L. Further, the inductor current IL changes from the negative slope to the positive slope in response to a pulse PO_ON of the zero-current detecting signal ZCDO generated when a magnitude of a current flowing through the inductor L is zero. However, the zero-current detector 1120 of the step-down converter 1000 in accordance with example embodiments of inventive concepts has an offset voltage, and therefore generates the pulse PO_ON of the zero-current detecting signal ZCDO to change the inductor current IL from the negative slope to the positive slope before the inductor current IL becomes zero. As described below, when a voltage of the output node NO of the power converting unit 1200 is lower than the reference voltage VREF, the first detection voltage signal VDET_O has a logic low state, and the zero-current detector 1120 provides an additional driving current to the output node NO. Therefore, the zero-current detecting signal ZCDO is generated before the inductor current IL becomes zero. When the first detection voltage signal VDET_O is in a logic high state, the zero-current detector 1120 does not have an offset voltage.

Figure 3:
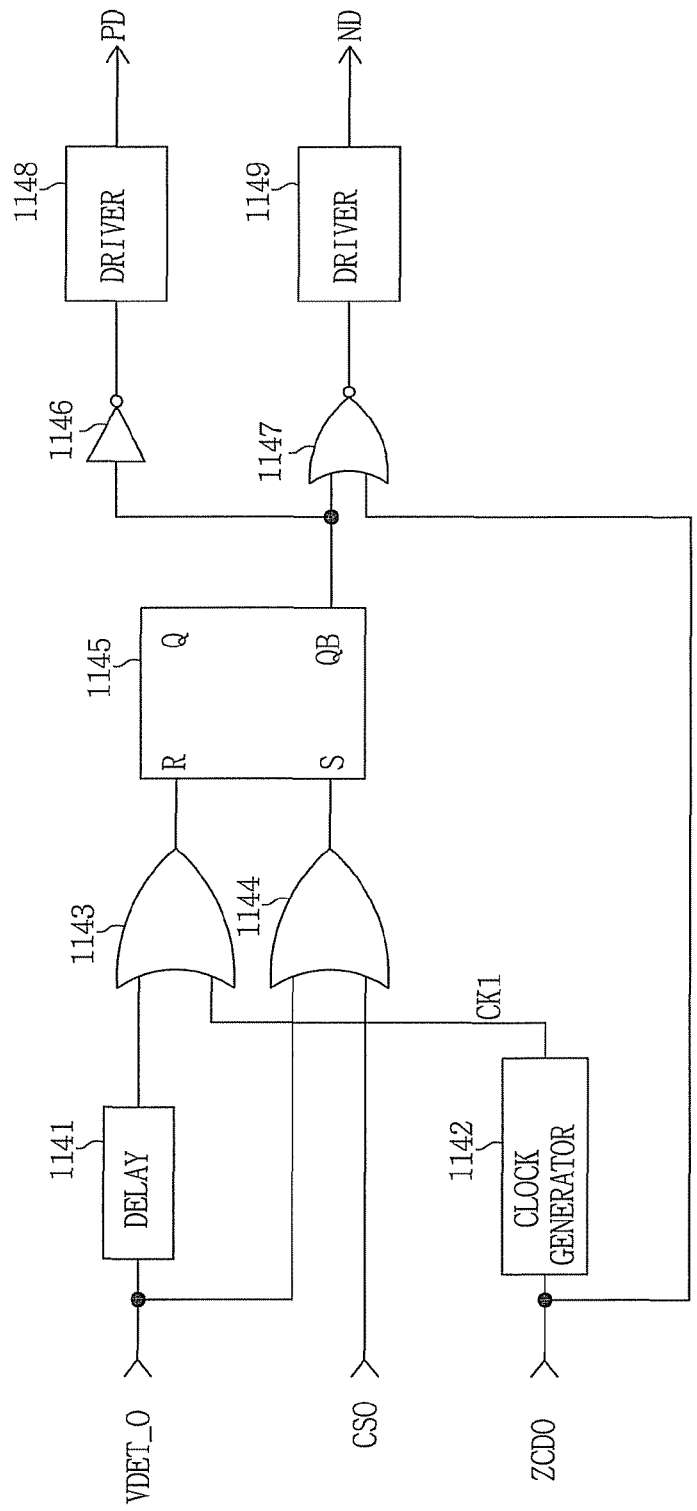
FIG. 3 is a circuit diagram illustrating a pulse-frequency modulating circuit included in the step-down converter shown in FIG. 1 in accordance with an example embodiment of inventive concepts.

FIG. 3 is a circuit diagram illustrating a pulse-frequency modulating circuit 1140 included in the step-down converter 1000 shown in FIG. 1 in accordance with an example embodiment of inventive concepts.

Referring to FIG. 3, the pulse-frequency modulating circuit 1140 may include a delay circuit 1141, a clock generator 1142, a first OR circuit 1143, a second OR circuit 1144, a latch circuit 1145, an inverter 1146, an NOR circuit 1147, a first driver 1148 and a second driver 1149.

The delay circuit 1141 delays the first detection voltage signal VDET_O, and the clock generator 1142 generates a clock signal CK1 based on the zero-current detecting signal ZCDO. The first OR circuit 1143 performs a logical OR operation on an output signal of the delay circuit 1141 and the clock signal CK1. The second OR circuit 1144 performs a logical OR operation on the first detection voltage signal VDET_O and the current-sensing output signal CSO. The latch circuit 1145 may be configured of a RS flip flop and latches an output signal of the first OR circuit 1143 and an output signal of the second OR circuit 1144. The NOR circuit 1147 performs a logical NOR operation on the output signal of the latch circuit 1145 and the zero-current detecting signal ZCDO. The inverter 1146 inverts a phase of the output signal of the latch circuit 1145. The first driver 1148 generates the pull-up driving signal PD in response to an output signal of the inverter 1146. The second driver 1149 generates the pull-down driving signal ND in response to an output signal of the NOR circuit 1147.

Hereinafter, the operation of the pulse-frequency modulating circuit 1140 shown in FIG. 3 will be described.

When the first detection voltage signal VDET_O is in a logic low state, the pulse-frequency modulating circuit 1140 activates the first driver 1148 to enable the pull-up driving signal PD and inactivates the second driver 1149 to disable the pull-down driving signal ND. Therefore, the pull-up transistor PMP in FIG. 1 is turned on and the pull-down transistor PMN in FIG. 1 is turned off. Accordingly, the inductor current IL increases and the DC output voltage VOUT increases.

When the first detection voltage signal VDET_O is in a logic high state, the pulse-frequency modulating circuit 1140 inactivates the first driver 1148 to disable the pull-up driving signal PD and activates the second driver 1149 to enable the pull-down driving signal ND. Therefore, the pull-up transistor PMP in FIG. 1 is turned off and the pull-down transistor PMN in FIG. 1 is turned on. Accordingly, the inductor current IL decreases and the DC output voltage VOUT decreases.

When the current-sensing output signal CSO generated based on the peak current of the inductor IL is enabled, the first driver 1148 is inactivated and the pull-up driving signal PD is disabled, and the second driver 1149 is activated and the pull-down driving signal ND is enabled. Therefore, the pull-up transistor PMP in FIG. 1 is turned off and the pull-down transistor PMN in FIG. 1 is turned on.

When the zero-current detecting signal ZCDO generated based on a zero current of the inductor L is enabled, the pulse-frequency modulating circuit 1140 activates the first driver 1148 to enable the pull-up driving signal PD and inactivates the second driver 1149 to disable the pull-down driving signal ND. Therefore, the pull-up transistor PMP in FIG. 1 is turned on and the pull-down transistor PMN in FIG. 1 is turned off. Accordingly, the inductor current IL increases and the DC output voltage VOUT increases.

Figure 4:
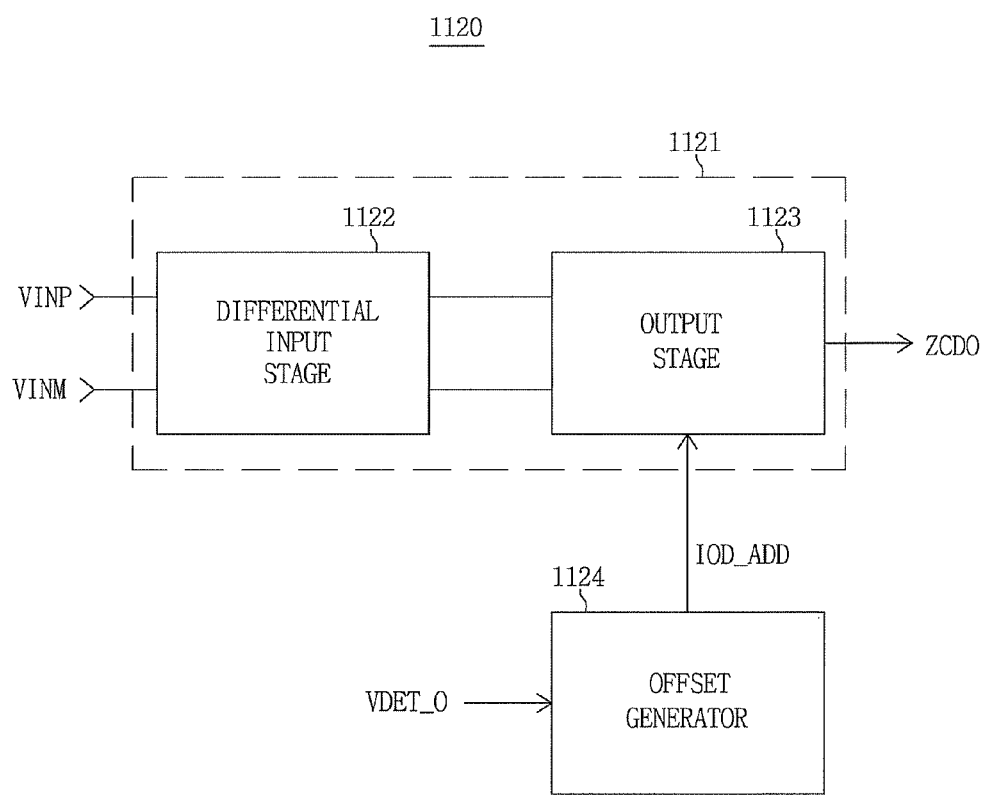
FIG. 4 is a block diagram illustrating a zero-current detector included in the step-down converter shown in FIG. 1 in accordance with an example embodiment of inventive concepts.

FIG. 4 is a block diagram illustrating the zero-current detector 1120 included in the step-down converter 1000 shown in FIG. 1 in accordance with an example embodiment of inventive concepts.

Referring to FIG. 4, the zero-current detector 1120 may include an amplifier 1121 and an offset generator 1124. The amplifier 1121 may be an operational amplifier.

The offset generator 1124 generates an additional driving current IOD_ADD in response to the first detection voltage signal VDET_O. The amplifier 1121 amplifies a difference between two differential input signals VINP and VINM, and generates the zero-current detecting signal ZCDO that incorporates the additional driving current. VINP may be the voltage signal of the sensing node NS in FIG. 1, and VINM may be the ground voltage.

The amplifier 1121 may have a differential input stage 1122 that amplifies the difference between the differential input signals VINP and VINM, and an output stage 1123 that amplifies an output signal of the differential input stage 1122 to generate the zero-current detecting signal ZCDO.

Figure 5:
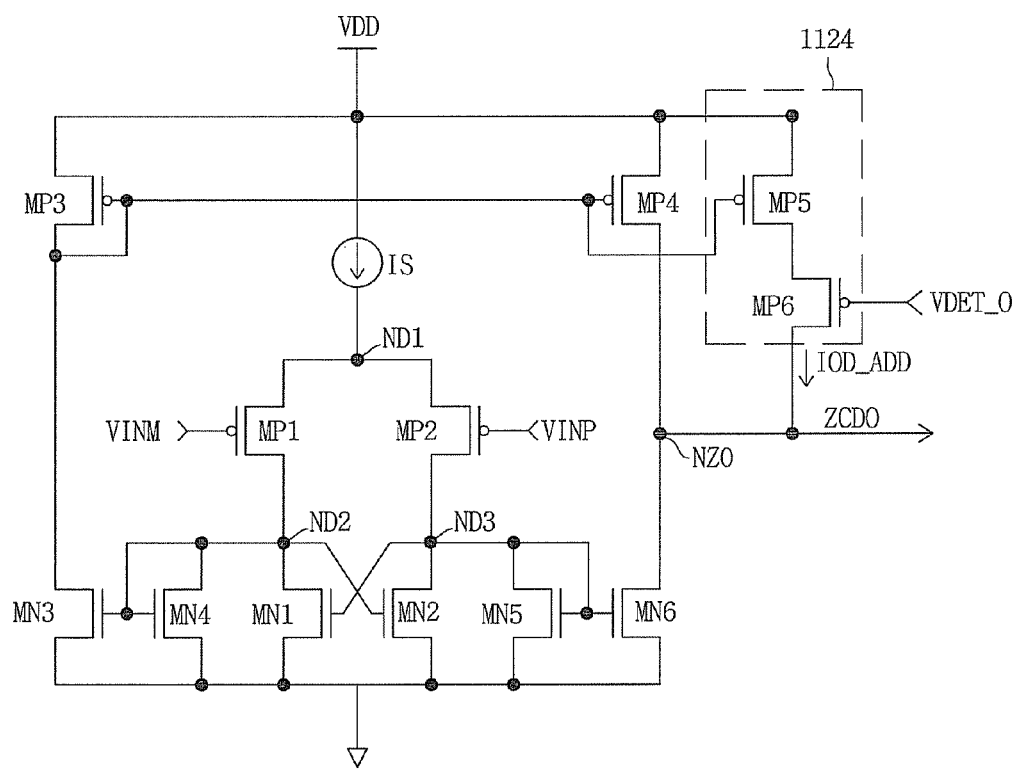
FIG. 5 is a circuit diagram illustrating a concrete structure of the zero-current detector included in the step-down converter shown in FIG. 4 in accordance with an example embodiment of inventive concepts.

FIG. 5 is a circuit diagram illustrating a concrete structure of the zero-current detector 1120 included in the step-down converter 1000 shown in FIG. 4 in accordance with an example embodiment of inventive concepts.

Referring to FIG. 5, the zero-current detector 1120*a* may include a current source IS, PMOS transistors MP1, MP2, MP3, MP4, MP5, and MP6 and NMOS transistors MN1, MN2, MN3, MN4, MN5 and MN6.

The PMOS transistors MP5 and MP6 construct the offset generator 1124 in FIG. 4, and the PMOS transistors MP1, MP2, MP3 and MP4 and the NMOS transistors MN1, MN2, MN3, MN4, MN5 and MN6 construct the amplifier 1121 in FIG. 4. The current source IS, PMOS transistors MP1 and MP2 and the NMOS transistors MN1 and MN2 correspond to the differential input stage 1122 in FIG. 4, and the PMOS transistors MP3 and MP4 and the NMOS transistors MN3, MN4, MN5 and MN6 correspond to the output stage 1123 in FIG. 4.

Referring to FIG. 5, the current source IS may be electrically coupled between a supply voltage VDD and a first node ND1. The PMOS transistor MP1 is electrically coupled between the first node ND1 and a second node ND2, and has a gate to which the differential input signal VINM is applied. The PMOS transistor MP2 is electrically coupled between the first node ND1 and a third node ND3, and has a gate to which the differential input signal VINP is applied. The NMOS transistor MN1 is electrically coupled between the second node ND2 and the ground voltage, and the NMOS transistor MN2 is electrically coupled between the third node ND3 and the ground voltage. A drain of the NMOS transistor MN1 is electrically connected to a gate of the NMOS transistor MN2, and a gate of the NMOS transistor MN1 is electrically connected to a drain of the NMOS transistor MN2. The NMOS transistor MN4 has a diode form, and is electrically coupled between the second node ND2 and the ground voltage. The NMOS transistor MN5 has a diode form, and is electrically coupled between the third node ND3 and the ground voltage. The NMOS transistor MN3 has a gate connected to a gate of the NMOS transistor MN4 and a source connected to the ground voltage. The NMOS transistor MN6 has a gate connected to a gate of the NMOS transistor MN5, a drain connected to a fourth node NZO and a source connected to the ground voltage. The PMOS transistor MP3 has a diode form, a source connected to the supply voltage VDD, and a drain connected to a drain of the NMOS transistor MN3. The PMOS transistor MP4 has a gate connected to a gate of the PMOS transistor MP3, a source connected to the supply voltage VDD, and a drain connected to the fourth node NZO.

The PMOS transistor MP5 has a gate connected to the gate of the PMOS transistor MP4 and a source connected to the supply voltage VDD. The PMOS transistor MP6 has a source connected to a drain of the PMOS transistor MP5, a drain connected to the fourth node NZO, and a gate to which the first detection voltage signal VDET_O is applied.

The zero-current detecting signal ZCDO is output from the fourth node NZO of the zero-current detector 1120a. The offset generator 1124 comprised of the PMOS transistors MP5 and MP6 generates the additional driving current IOD_ADD in response to the first detection voltage signal VDET_O.

Hereinafter, operation of the zero-current detector 1120 and the step-down converter 1000 including the zero-current detector 1120 will be described referring to FIGS. 1 through 5.

Referring to FIG. 1, the switch driving circuit 1100 detects the DC output voltage VOUT, the peak current flowing through the inductor L and the zero current of the inductor L, and generates the pull-up driving signal PD and the pull-down driving signal ND. The power converting unit 1200 generates the DC output voltage VOUT based on the pull-up driving signal PD, the pull-down driving signal ND and the DC input voltage YIN.

When both of the pull-up driving signal PD and the pull-down driving signal ND are in a logic low state, the pull-up transistor PMP is turned on and the pull-down transistor PMN is turned off. When the pull-up transistor PMP is turned on, the DC input voltage VIN is applied to the sensing node NS, and a resonant current may flow through the inductor L, the capacitor C and a parasitic capacitor of the pull down transistor PMN. When both the pull-up driving signal PD and the pull-down driving signal ND are in a logic high state, the pull-up transistor PMP is turned off and the pull-down transistor PMN is turned on. When the pull-down transistor PMN is turned on, the resonant current may flow through the inductor L, the capacitor C and the pull down transistor PMN, and the magnitude of the inductor current may gradually decrease. When the voltage between the sensing node NS and the ground voltage, which is a voltage across the pull-down transistor PMN, changes from a negative value to a positive value, the zero-current detecting signal ZCDO is generated. Therefore, the pull-up transistor PMP is turned on and the pull-down transistor PMN is turned off. Referring to FIG. 2, the step-down converter 1000 according to an example embodiment of inventive concepts turns on the pull-up transistor PMP and turns off the pull-down transistor PMN to increase the inductor current IL using the zero-current detecting signal ZCDO that has offset before the inductor current IL flows in the reverse direction.

Figure 6:
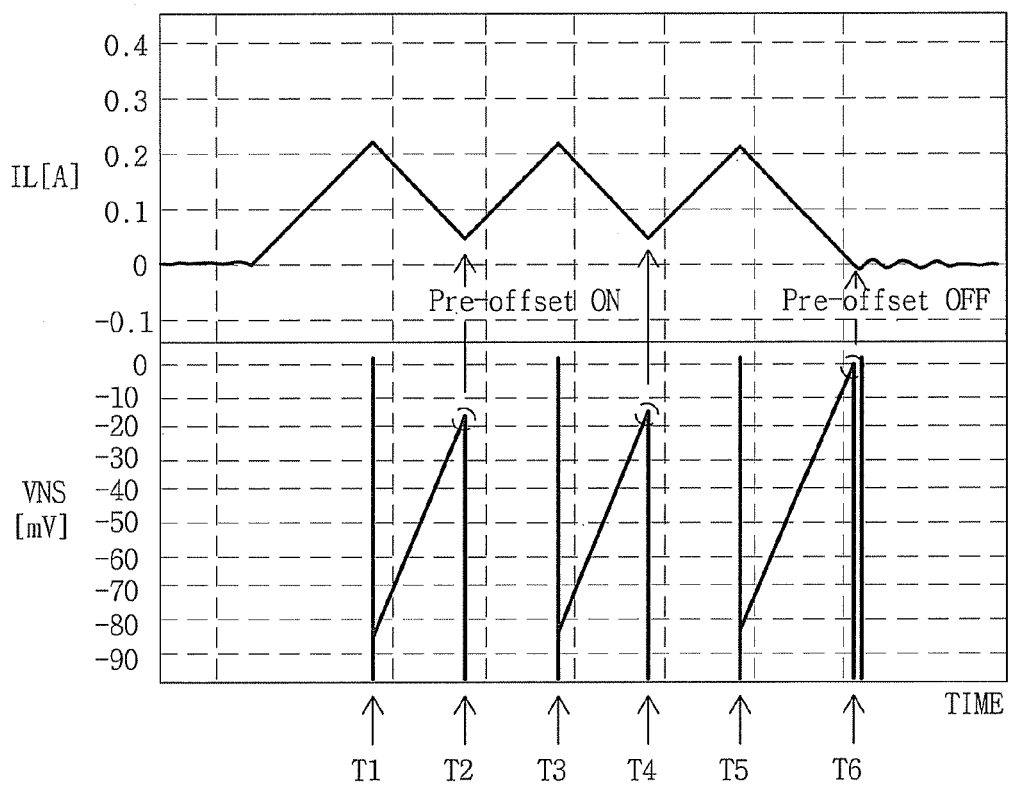
FIG. 6 is a simulation diagram illustrating operation of the step-down converter shown in FIG. 1.

FIG. 6 is a simulation diagram illustrating operation of the step-down converter shown in FIG. 1.

Referring to FIG. 6, the inductor current IL changes from the positive slope to the negative slope at the time point T1, the voltage VNS of the sensing node NS increases, the zero-current detecting signal ZCDO is enabled (Pre-offset ON) at the time point T2, and the inductor current IL changes from the negative slope to the positive slope. Likewise, the inductor current IL changes from the positive slope to the negative slope at the time point T3, and changes from the negative slope to the positive slope at the time point T4. Further, the inductor current IL changes from the positive slope to the negative slope at the time point T5, and at the time point T6 the zero-current detector 1120 does not have offset voltage (Pre-offset OFF) because the first detection voltage signal VDET_O changes to a logic high state.

Figure 7:
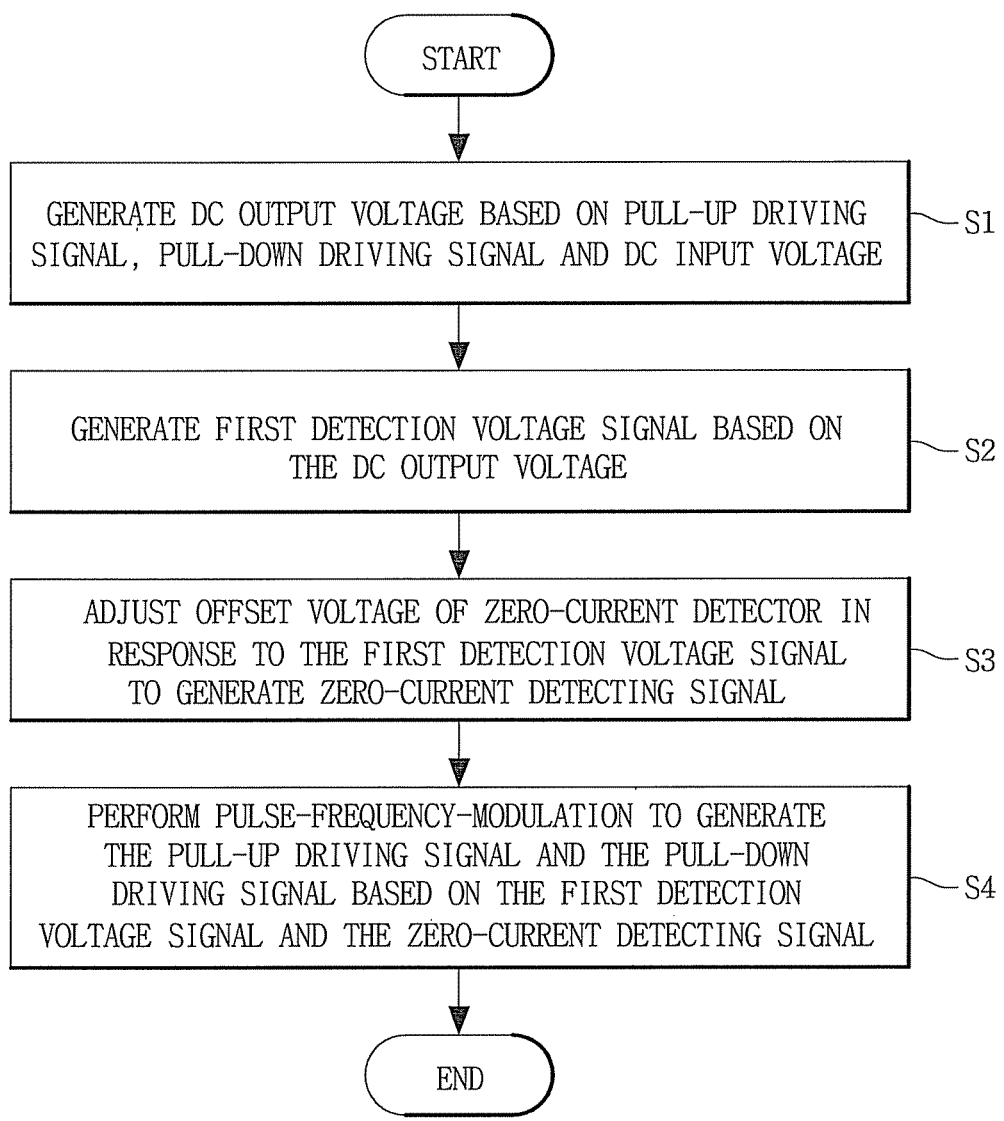
FIG. 7 is a flowchart illustrating a method of power conversion in accordance with example embodiments of inventive concepts.

FIG. 7 is a flowchart illustrating a method of power conversion in accordance with example embodiments of inventive concepts.

Referring to FIG. 7, the method of power conversion in accordance with example embodiments of inventive concepts includes the following operations of:
1) generating a DC output voltage based on a pull-up driving signal, a pull-down driving signal and a DC input voltage (S1);
2) generating a first detection voltage signal based on the DC output voltage (S2);
3) adjusting an offset voltage of a zero-current detector in response to the first detection voltage signal to generate a zero-current detecting signal (S3); and
4) performing a PFM to generate the pull-up driving signal and the pull-down driving signal based on the first detection voltage signal and the zero-current detecting signal (S4).

Figure 8:
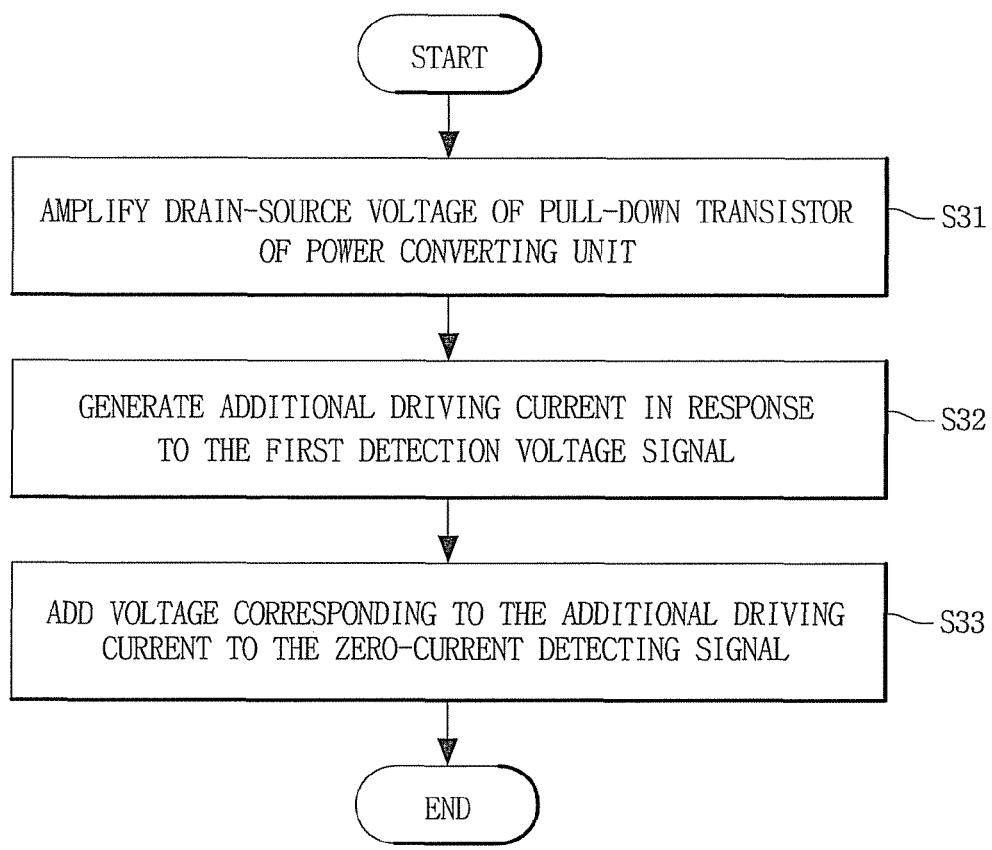
FIG. 8 is a flowchart illustrating a method of adjusting an offset voltage of a zero-current detector in a method of power conversion in accordance with example embodiments of inventive concepts.

FIG. 8 is a flowchart illustrating a method of adjusting an offset voltage of a zero-current detector in a method of power conversion in accordance with example embodiments of inventive concepts.

Referring to FIG. 8, a method of adjusting an offset voltage of a zero-current detector in the method of power conversion shown in FIG. 7 may include the following operations of:
1) amplifying a drain-source voltage of a pull-down transistor of a power converting unit (S31);
2) generating an additional driving current in response to the first detection voltage signal (S32); and
3) incorporating the additional driving current to the zero-current detecting signal (S33).

In the above, a step-down converter including a zero-current detector is mainly described, but example embodiments of inventive concepts may be applied to a boost converter and a buck-boost converter.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages. Accordingly, all such modifications are intended to be included within the scope of inventive concepts as defined in the claims. In the claims, means-plus-function clauses are intended to cover the structures described herein as performing the recited function, and not only structural equivalents but also equivalent structures. Therefore, it is to be understood that the foregoing is illustrative of various example embodiments and is not to be construed as limited to the specific embodiments disclosed, and that modifications to the disclosed example embodiments, as well as other example embodiments, are intended to be included within the scope of the appended claims.

What is claimed is:
1. A power converter comprising:
a power converting unit configured to generate a direct current (DC) output voltage based on a pull-up driving signal, a pull-down driving signal and a DC input voltage; and a switch driving circuit configured to generate a first detection voltage signal based on the DC output voltage, the switch driving circuit including,
  a zero-current detector configured to adjust an offset voltage based on the first detection voltage signal and generate a zero-current detecting signal based on the offset voltage, the offset voltage and the zero-current detecting signal associated with a current in the power converting unit, and
  a pulse-frequency modulating circuit configured to perform a pulse-frequency-modulation (PFM) to generate the pull-up driving signal and the pull-down driving signal based on the zero-current detecting signal, wherein
the power converting unit includes,
  a pull-up transistor having an input terminal configured to receive the DC input voltage and an output terminal connected to a first node of the power converting unit, the pull-up transistor being configured to operate in response to the pull-up driving signal,
  a pull-down transistor coupled between the first node and a ground voltage source, the pull-down transistor being configured to operate in response to the pull-down driving signal,
  an inductor coupled between the first node and an output node of the power converting unit, and
  a capacitor coupled between the output node and the ground voltage source,
the zero-current detector is configured to generate the zero-current detecting signal based on a voltage of the first node and the ground voltage and the zero-current detector includes,
  an offset generator configured to generate an additional driving current in response to the first detection voltage signal, and
  an amplifier configured to amplify a difference between the voltage of the first node and the ground voltage, the zero-current detecting signal based on the additional driving current and the amplified difference, the amplifier includes,
    a differential input stage configured to amplify the difference between the voltage of the first node and the ground voltage, and
    an output stage configured to amplify an output signal of the differential input stage to generate the zero-current detecting signal, and the offset generator includes,
  a first transistor connected to a transistor of the output stage, and
  a second transistor coupled between the first transistor and an output terminal of the zero-current detector, the second transistor configured to operate in response to the first detection voltage signal.

2. The power converter of claim 1, wherein the zero-current detector is configured to output the zero-current detecting signal at a time, the time being advanced based on the additional driving current.

3. A power converter comprising:
  a power converting unit configured to generate a direct current (DC) output voltage based on a pull-up driving signal, a pull-down driving signal and a DC input voltage; and
  a switch driving circuit configured to generate a first detection voltage signal based on the DC output voltage, the switch driving circuit including,
    a zero-current detector configured to adjust an offset voltage based on the first detection voltage signal and generate a zero-current detecting signal based on the offset voltage, the offset voltage and the zero-current detecting signal associated with a current in the power converting unit, and
    a pulse-frequency modulating circuit configured to perform a pulse-frequency-modulation (PFM) to generate the pull-up driving signal and the pull-down driving signal based on the zero-current detecting signal, wherein the power converting unit includes,
  a pull-up transistor having an input terminal configured to receive the DC input voltage and an output terminal connected to a first node of the power converting unit, the pull-up transistor being configured to operate in response to the pull-up driving signal,
  a pull-down transistor coupled between the first node and a ground voltage source, the pull-down transistor being configured to operate in response to the pull-down driving signal,
  an inductor coupled between the first node and an output node of the power converting unit, and
  a capacitor coupled between the output node and the ground voltage source,
the zero-current detector is configured to generate the zero-current detecting signal based on a voltage of the first node and the ground voltage,
the switch driving circuit includes,
  a comparator configured to compare the DC output voltage with a reference voltage and generate the first detection voltage signal based on the comparison, and
  a current sensor configured to detect a current of the inductor and generate a current-sensing output signal based on the detected current, the pulse-frequency modulating circuit is configured to perform the pulse frequency modulation (PFM) based on the first detection voltage signal, the zero-current detecting signal and the current-sensing output signal, and generate the pull-up driving signal and the pull-down driving signal based on the PFM, and
the pulse-frequency modulating circuit includes,
  a delay circuit configured to delay the first detection voltage signal,
  a clock generator configured to generate a clock signal based on the zero-current detecting signal,
  a first OR circuit configured to perform a logical OR operation on an output signal of the delay circuit and the clock signal,
  a second OR circuit configured to perform a logical OR operation on the first detection voltage signal and the current-sensing output signal,
  a latch circuit configured to latch an output signal of the first OR circuit and an output signal of the second OR circuit,
  an NOR circuit configured to perform a logical NOR operation on an output signal of the latch circuit and the zero-current detecting signal,
  an inverter configured to invert a phase of an output signal of the latch circuit,
  a first driver configured to generate the pull-up driving signal in response to an output signal of the inverter, and
  a second driver configured to generate the pull-down driving signal in response to an output signal of the NOR circuit.

* * * * *